No. 879,027. PATENTED FEB. 11, 1908.
L. M. G. DELAUNAY-BELLEVILLE.
AUTOMOBILE.
APPLICATION FILED SEPT. 30, 1907.

Witnesses:

Inventor
Louis M. G. Delaunay-Belleville
By James L. Norris
Atty

UNITED STATES PATENT OFFICE.

LOUIS MARIE GABRIEL DELAUNAY-BELLEVILLE, OF PARIS, FRANCE, ASSIGNOR TO SOCIÉTÉ ANONYME DES AUTOMOBILES DELAUNAY-BELLEVILLE, OF ST.-DENIS, SEINE, FRANCE, A CORPORATION OF FRANCE.

AUTOMOBILE.

No. 879,027.     Specification of Letters Patent.     Patented Feb. 11, 1908.

Application filed September 30, 1907. Serial No. 395,206.

*To all whom it may concern:*

Be it known that I, LOUIS MARIE GABRIEL DELAUNAY-BELLEVILLE, citizen of the French Republic, residing at Paris, Department of Seine, in France, have invented certain new and useful Improvements Relating to the Attachment of the Rear-Bridge Cardan-Tube in Automobiles, of which the following is a specification.

Figure 1:
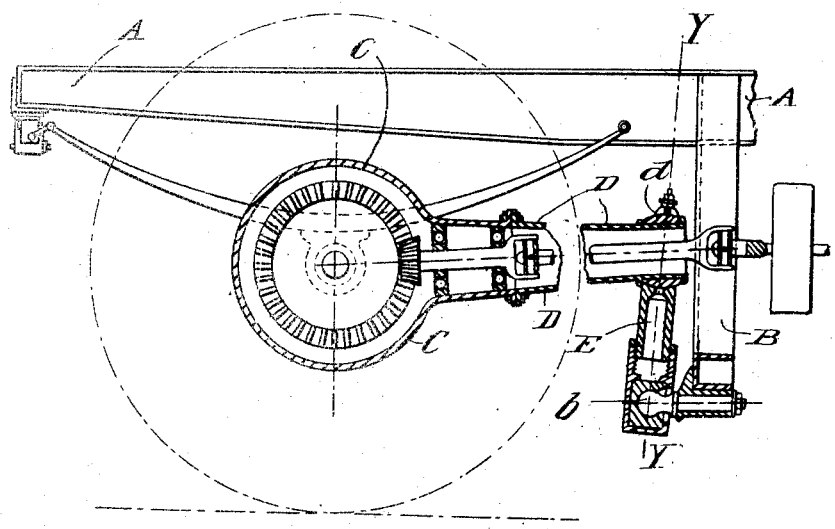
Figure 2:
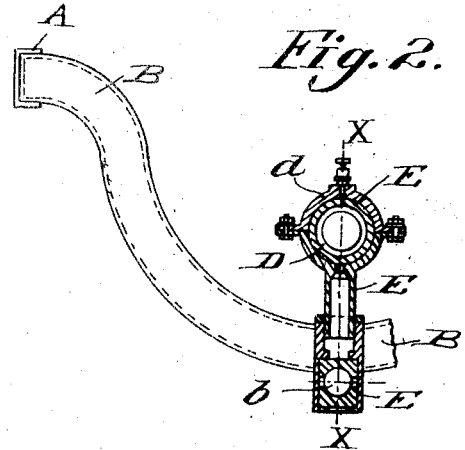

In the rear bridges of automobiles, the differential of which is connected with the change speed gear by a double cardan shaft, the casing of the differential carrying the driving pinion and its shaft should be connected with the chassis by a rigid part attached to the fixed parts of the said chassis by means of a part which is elastic and adapted to be arranged in various directions, to admit of the relative displacements due particularly to the equal or unequal extensions of the suspension springs. This connection is usually constituted by a light beam arranged at one side of the cardan shaft, bolted at one of its extremities to the casing of the differential and connected at the other extremity to a transverse member of the chassis. The novel arrangement forming the object of the present application consists in replacing the said beam at one side of the cardan shaft as heretofore employed, by a tube serving as a protecting sleeve for the cardan shaft. This tube is fixed at its extremity by means of a flange, screw thread or in any other convenient manner, in line with the box of the differential with which it thus forms a unit. The other extremity being intended for movement in all directions, is connected to the chassis by means of a connecting rod one point of articulation of which is constituted by a ball and socket joint fixed rigidly to a transverse member, while the other point of articulation is constituted by the front part of the tube itself ending in a ball and socket joint. This connecting rod may be arranged above or below the cardan tube and its length may either be fixed or variable. It may also comprise springs serving to deaden shocks arising from the vertical reactions produced on starting. This arrangement is represented in the accompanying drawings, in which:

Figure 1 is a vertical section on the line X—X of Fig. 2. Fig. 2 is a section on the line Y—Y of Fig. 1.

A is the frame.

B is the transverse member fixed to the frame.

C is the box of the differential.

D is the tube serving as a protecting casing or sleeve for the cardan shaft. This tube is fixed at its rear extremity to the box C of the differential, its front extremity carries a ball joint $d$.

E is the connecting rod connecting the ball joint $d$ of the front extremity of the tube D with the ball joint $b$ fixed to the transverse member B and consequently to the chassis A.

When starting braking, and when jolts occur, the vertical and longitudinal reactions which are transmitted to the extremities of the casing tube D are supported by the connecting rod E. The angular or longitudinal movements of the casing tube D are effected without difficulty owing to the ball and socket joints $b$ and $d$ the play between the tube and the cardan shaft being sufficient to prevent these displacements from causing the tube to come into contact with the shaft that it protects.

Having thus described and ascertained the nature of my invention and in what manner the same may be performed, I declare that what I claim is:

A device of the class described comprising a tube forming a forward extension of the differential box and surrounding the cardan shaft but not touching it, the front part of this tube ending in a socket and being supported in a bearing arranged at the extremity of a single connecting rod, the other extremity of which is able to rock around a ball fixed rigidly to the chassis.

In testimony whereof I have hereunto set my hand in presence of two subscribing witnesses.

LOUIS MARIE GABRIEL
                      DELAUNAY-BELLEVILLE.

Witnesses:
   H. C. COXE,
   EMILE KLOTZ.